US011929218B2

(12) United States Patent
Plechinger

(10) Patent No.: US 11,929,218 B2
(45) Date of Patent: Mar. 12, 2024

(54) ROCKER ARM OF AN ELECTRIC SWITCH, BLOCKING DEVICE WITH SUCH A ROCKER ARM, AND ELECTRIC SWITCH WITH SUCH A ROCKER ARM AND SUCH A BLOCKING DEVICE

(71) Applicant: Siemens Aktiengesellschaft, Munich (DE)

(72) Inventor: Ekkehard Plechinger, Roeckersbuehl (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 17/241,413

(22) Filed: Apr. 27, 2021

(65) Prior Publication Data

US 2021/0343490 A1 Nov. 4, 2021

(30) Foreign Application Priority Data

Apr. 29, 2020 (DE) ..................... 10 2020 205 389.8

(51) Int. Cl.

*H01H 23/14* (2006.01)
*H01H 23/20* (2006.01)
*H01H 23/28* (2006.01)

(52) U.S. Cl.

CPC ........ *H01H 23/143* (2013.01); *H01H 23/205* (2013.01); *H01H 23/28* (2013.01)

(58) Field of Classification Search

CPC .... H01H 23/143; H01H 23/30; H01H 23/025; H01H 2300/03; H01H 23/145; H01H 2221/016; H01H 23/14; H01H 23/04; H01H 23/168; H01H 2221/018; H01H 23/02; H01H 23/12; H01H 23/003; H01H 23/146; H01H 23/16; H01H 23/20; H01H 23/28; H01H 23/00; H01H 23/148; H01H 23/24; H01H 23/26; H01H 9/282; H01H 3/10; H01H 2071/565; H01H 9/22; H01H 9/283; H01H 9/281; H01H 9/28; H01H 9/286; H01H 9/285; H01H 9/223; H01H 71/1054; H01H 2300/024; H01H 19/03; H01H 27/08

See application file for complete search history.

(56) References Cited

U.S. PATENT DOCUMENTS 5,998,743 A 12/1999 Unkel
6,084,186 A * 7/2000 Shaffer .................... H01H 3/20 200/322

(Continued)

FOREIGN PATENT DOCUMENTS

CN 1209901 A 3/1999
CN 1598987 A 3/2005

(Continued)

*Primary Examiner* — Ahmed M Saeed
(74) *Attorney, Agent, or Firm* — Harness, Dickey & Pierce, P.L.C.

(57) ABSTRACT

In a rocker arm of an electric switch, the electric switch is actuated by the rocker arm for setting definable positions. The rocker arm of an embodiment includes a first part, for setting the definable positions, and a second part, movable between a first position and a second position. In the first position of the second part, the first part can be moved into the definable positions; and in the second position of the second part, the movement of the first part is blocked.

17 Claims, 4 Drawing Sheets

(56) References Cited

U.S. PATENT DOCUMENTS

| | | | | |
|---|---|---|---|---|
| 6,791,040 | B1 | 9/2004 | Puhalla et al. | |
| 6,940,027 | B1 | 9/2005 | Sipe | |
| 7,868,261 | B2 * | 1/2011 | Gauzin | H01H 3/20 200/43.16 |
| 2007/0139144 | A1 | 6/2007 | Barnklau et al. | |
| 2013/0228428 | A1 | 9/2013 | Bunk et al. | |
| 2015/0221459 | A1 * | 8/2015 | Oneufer | H01H 9/282 200/50.26 |
| 2017/0186579 | A1 | 6/2017 | Seo | |

FOREIGN PATENT DOCUMENTS

| | | | |
|---|---|---|---|
| CN | 1701404 | A | 11/2005 |
| CN | 103295807 | A | 9/2013 |
| CN | 106460409 | A | 2/2017 |
| CN | 108884690 | A | 11/2018 |
| DE | 4110982 | A1 | 10/1992 |
| DE | 4439374 | C1 | 2/1996 |
| DE | 19934542 | C1 | 3/2001 |
| DE | 102011082255 | A1 | 3/2013 |
| JP | H09153327 | A | 6/1997 |

* cited by examiner

ROCKER ARM OF AN ELECTRIC SWITCH, BLOCKING DEVICE WITH SUCH A ROCKER ARM, AND ELECTRIC SWITCH WITH SUCH A ROCKER ARM AND SUCH A BLOCKING DEVICE

PRIORITY STATEMENT

The present application hereby claims priority under 35 U.S.C. § 119 to German patent application number DE 102020205389.8 filed Apr. 29, 2020, the entire contents of which are hereby incorporated herein by reference.

FIELD

Example embodiments of the invention generally relate to a rocker arm of an electric switch, to a blocking device with such a rocker arm and to an electric switch with such a rocker arm and such a blocking device.

BACKGROUND

Electric circuit breakers may be equipped with a rocker arm, by which the circuit breaker is actuated to switch the electric current. A user of such a circuit breaker can be offered the possibility of locking it in various switch positions, such that the circuit breaker cannot be actuated unintentionally. It may for example be desired for the circuit breaker to be locked in the OFF position ("OFF"), in which a circuit through the circuit breaker is open. Similarly, it may be desired that the circuit breaker can be locked in the ON position ("ON"), in which the circuit through the electric switch is closed.

DE 10 2011 082 255 A1 discloses a blocking device for an electromechanical switching device with a manual actuating option. The blocking device is distinguished by a combination of a small number of structurally and functionally coordinated, interacting structural elements. In this case, a blocking element undertakes a dual function, in that on the one hand it ensures the connection of the blocking device to the switching device and on the other hand it reliably prevents a change in the position of the actuating element of the switching device.

In the case of other actuating elements of circuit breakers, such as for example in case of rotary drives, constructions in which these rotary drives can be locked by way of shackle locks are likewise known. For example, this is known as an integrated solution, such that part of the rotary handle is pressed inward and held in this position by a shackle lock. By way of a slotted link, the pressed-in part of the rotary handle prevents it from being actuated. The rotary drive can be locked in the OFF position ("OFF"). Such a construction can also be modified by subsequently drilling a hole in the slotted link, such that the rotary drive can likewise be locked in the ON position ("ON").

SUMMARY

At least one embodiment of the present invention provides an alternative solution for a rocker arm of an electric switch that is of a simple construction and is robust and can be handled without a tool.

At least one embodiment of the invention is achieved by a rocker arm. Advantageous refinements of the rocker arm according to the invention are specified in description and claims. At least one embodiment of the invention is likewise achieved by a blocking device. Advantageous refinements of the blocking device are specified in description and claims. At least one embodiment of the invention is achieved by electric switches as described and claimed.

The rocker arm of an electric switch of an embodiment is designed such that the electric switch is actuatable by the rocker arm for setting definable positions, the rocker arm comprising a first part, for setting the definable positions, and a second part, movable between a first position and a second position, wherein, in the first position of the second part, the first part is movable into the definable positions, and wherein, in the second position of the second part, the movement of the first part is blocked.

The blocking device of an embodiment comprises a rocker arm according to an embodiment of the invention, wherein the blocking device comprises a slotted link with holes, which can be entered by a first end of the second part of the rocker arm at assigned positions among the predefined positions.

The electric switch of an embodiment is provided with a rocker arm according to an embodiment of the invention. The electric switch of an embodiment is provided with a blocking device according to an embodiment of the invention.

A rocker arm of an embodiment of the invention, is one of an electric switch, actuatable by the rocker arm for setting definable positions, the rocker arm comprising:

- a first part, for setting the definable positions; and
- a second part, movable between a first position and a second position,
- wherein, in the first position of the second part, the first part is movable into the definable positions, and wherein, in the second position of the second part), movement of the first part is blocked.

A blocking device of an embodiment of the invention comprises:

- the rocker arm of an embodiment; and
- a slotted link including holes, a first end of the second part of the rocker arm being configured to enter the holes at assigned positions among the definable positions.

BRIEF DESCRIPTION OF THE DRAWINGS

The above-described properties, features and advantages of this invention, and the manner in which they are achieved, will become clearer and more clearly comprehensible in conjunction with the description below of the example embodiments, which will be explained in more detail in conjunction with the figures, in which.

DETAILED DESCRIPTION OF EXAMPLE EMBODIMENTS

Figure 1A:
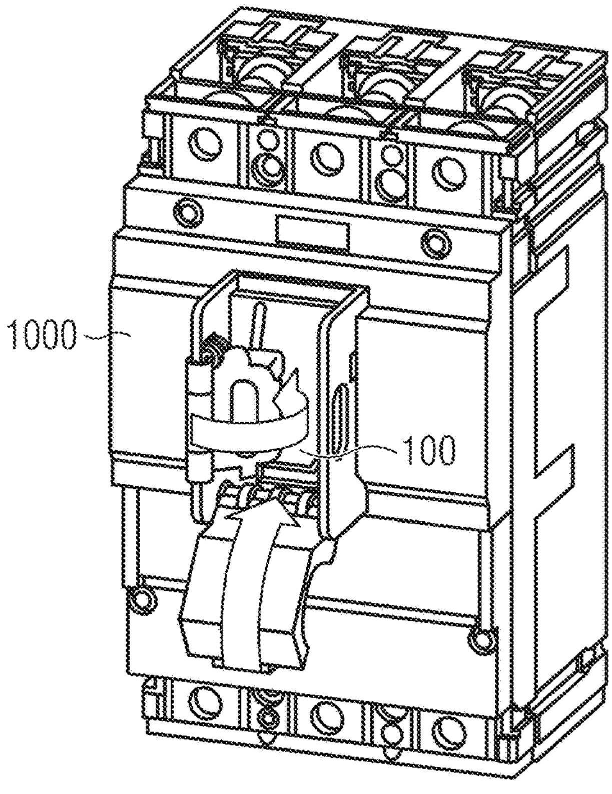
FIGS. 1A and 1B show a blocking device from the prior art.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. The present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

The rocker arm of an electric switch of an embodiment is designed in such a way that the electric switch is actuated by the rocker arm for setting predefined positions, wherein the rocker arm comprises a first part, for setting the predefined positions, and a second part, which is movable between a first position and a second position, wherein, in the first position of the second part, the first part can be moved into the predefined positions, and wherein, in the second position of the second part, the movement of the first part is blocked.

It is advantageous in the case of the rocker arm according to an embodiment of the invention that users, for example customers, do not need to have their own shackle lock assembly and there is always an integrated possibility of locking the rocker arm. Similarly, it is advantageous that the rocker arm according to an embodiment of the invention can be blocked with commercially available shackle locks.

The electric switch of an embodiment is provided with a rocker arm according to an embodiment of the invention. The electric switch of an embodiment is provided with a blocking device according to an embodiment of the invention.

In a refinement of the rocker arm according to an embodiment of the invention, the second part is pressed by a spring in the direction of the first position.

In a further refinement, the second part extends within the first part.

In a further refinement, the first part comprises a first bore and the second part comprises a second bore, such that, in the second position of the second part, these bores are in line.

In a refinement of the rocker arm according to an embodiment of the invention, the movement of the rocker arm passes through part of an arc of a circle with a center point.

In a further refinement, the second part is displaced radially when changing from the first position to the second position, or vice versa.

In a further refinement, the predefined positions comprise at least the ON position ("ON") for closing a circuit and the OFF position ("OFF") for opening the circuit. Furthermore, the predefined positions may comprise the tripped position ("TRIP").

The blocking device of an embodiment comprises a rocker arm according to an embodiment of the invention, wherein the blocking device comprises a slotted link with holes, which can be entered by a first end of the second part of the rocker arm at assigned positions among the predefined positions.

In a refinement of the blocking device, in the second position of the second part of the rocker arm, the first end of the second part enters one of these holes and thereby blocks the movement of the first part.

In a further refinement of the blocking device, it is provided with a slotted link with perforated holes, which a user can break out according to requirements.

In a further refinement of the blocking device according to an embodiment of the invention, this blocking device comprises a shackle lock, wherein a shackle of the shackle lock is hung on through the in-line bores in the second position of the second part of the rocker arm.

The electric switch of an embodiment is provided with a rocker arm according to an embodiment of the invention. The electric switch of an embodiment is provided with a blocking device according to an embodiment of the invention.

Figure 1B:
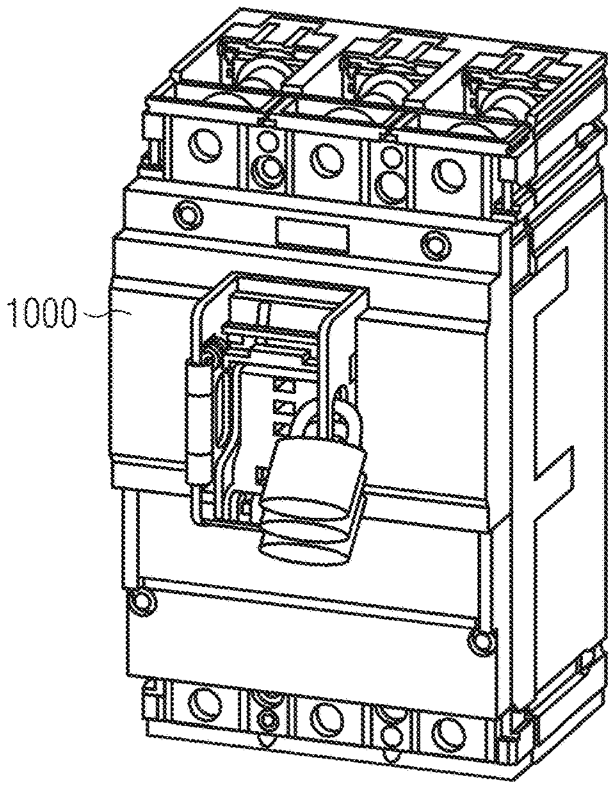

In FIGS. 1A and 1B, a blocking device known from DE 10 2011 082 255 A1 for an electric switch 1000 with a rocker arm 100 is shown. In FIG. 1A it is shown how the blocking device is open, and consequently actuation of the rocker arm 100 is possible, and in FIG. 1B it is shown that the blocking element is locked via shackle locks and the movement of the rocker arm 100 is no longer possible.

Figure 2A:
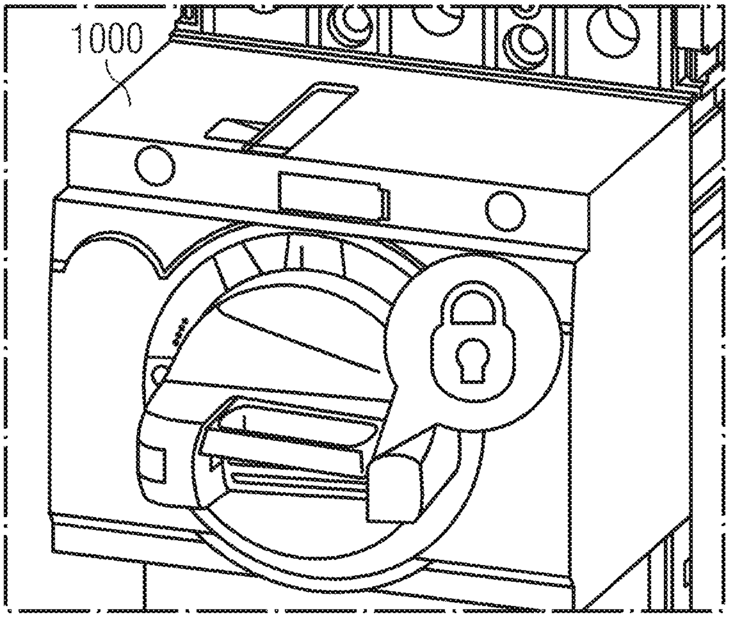
FIGS. 2A and 2B show a blocking device of an alternative configuration.
Figure 2B:
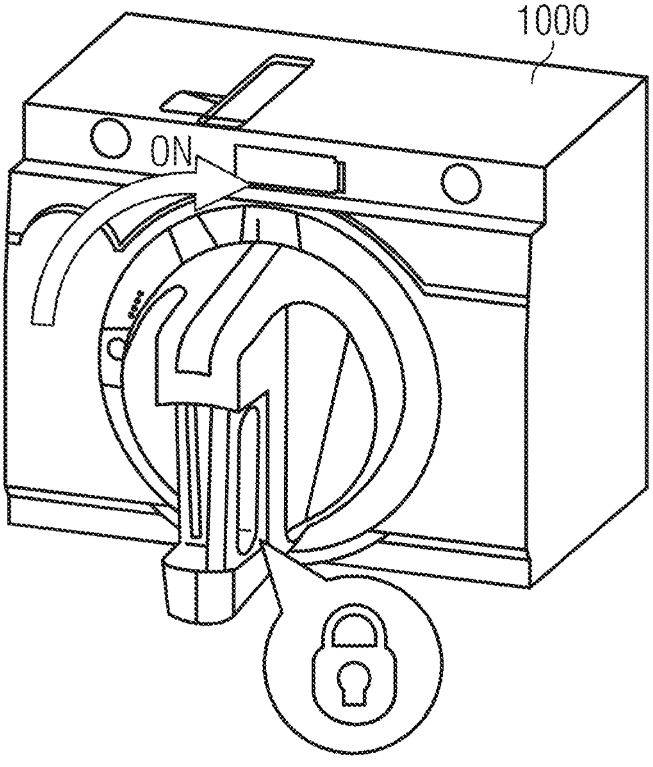

In FIGS. 2A and 2B, a known solution for a rotary drive of an electric switch 1000 is shown. Here, this rotary drive can likewise be locked or blocked via a pushbutton and a shackle lock.

Figure 3:
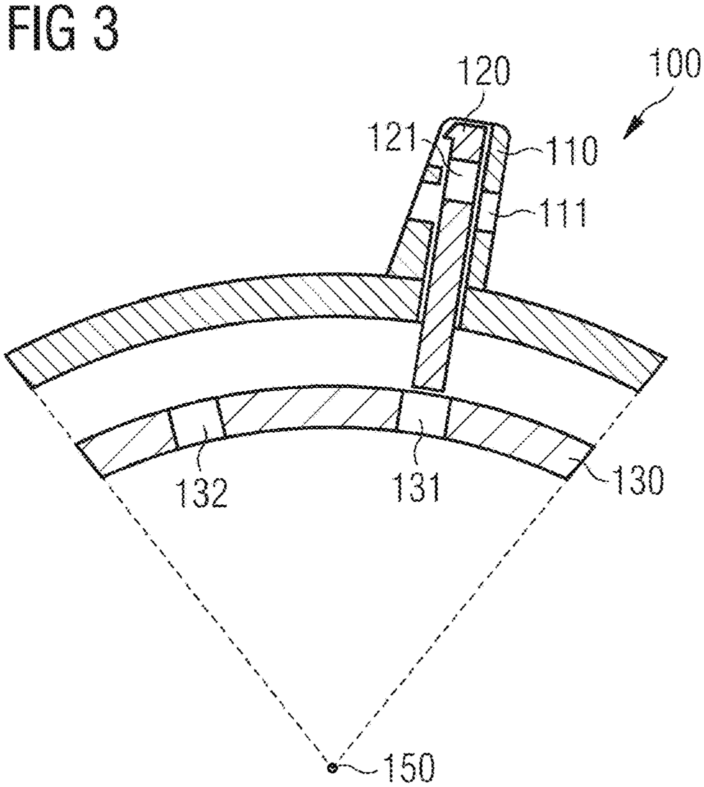
FIG. 3 shows a rocker arm according to an embodiment of the invention with a first part and a second part, wherein the second part is in the first position.

In FIG. 3, the rocker arm 100 according to an embodiment of the invention of an electric switch 1000 is shown. The electric switch 1000 is actuated by the rocker arm 100, and with it the definable positions of the electric switch 1000 are set. The positions may be for example the ON position ("ON") for closing a circuit through the electric switch 1000 and the OFF position ("OFF") for opening the circuit. Furthermore, the tripped position ("TRIP") can be set by the rocker arm 100.

The rocker arm 100 according to an embodiment of the invention comprises a first part 110, for setting the positions, and a second part 120, which is movable between a first position and a second position.

In the first position of the second part 120, the first part 110 can be moved into the predefined positions, in the second position of the second part 120, the movement of the first part 110 is blocked. In the representation of FIG. 3, the second part 120 is in the first position, such that the rocker arm 100 according to an embodiment of the invention can be moved into each predefined position.

The second part 120 can be pressed by a spring in the direction of the first position, in which the first part 110 can be moved into the predefined positions.

The second part 120 extends within the first part 110. This ensures that, when there is movement of the first part 110 into the predefined positions, the second part 120 is likewise moved along with it.

Figure 4:
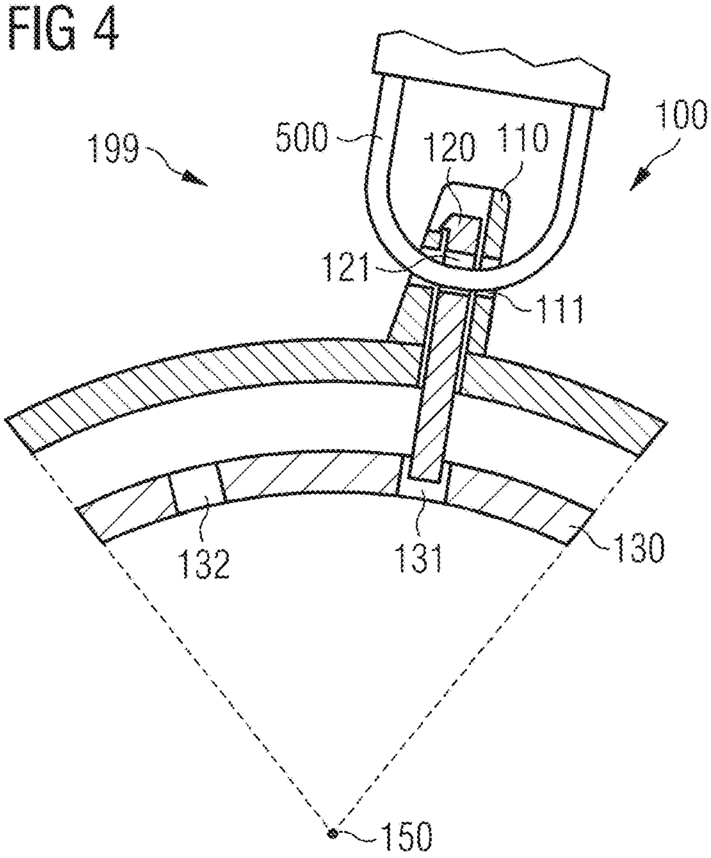
FIG. 4 shows a rocker arm according to an embodiment of the invention with a first part and a second part, wherein the second part is in the second position, and also a slotted link and a shackle lock.

The first part 110 has a first bore 111, the second part 120 has a second bore 121. The bores 111; 121 are provided on the first part 110 and the second part 120 in such a way that, in the second position of the second part 120, these bores 111; 121 are in line. This is shown in FIG. 4; the second part 120 is in the second position and the bores 111; 121 are in line. As a result, for example, the shackle of a shackle lock 500 can be hung on.

In a way corresponding to FIGS. 3 and 4, the movement of the rocker arm 100 can pass through part of an arc of a circle with a center point 150. The second part 120 can also be displaced radially when changing from the first position to the second position, or vice versa. This means that, for example in the movement from the position of FIG. 3 to FIG. 4, the second part 120 has been pushed radially toward the center point 150.

For blocking the rocker arm 100 in the second position of the second part 120, a slotted link 130 with holes 131; 132 is provided. One of these holes 131; 132 may be entered by the first end of the second part 120 of the rocker arm 100 at assigned positions among the predefined positions. In a way corresponding to the representation of FIG. 3 or FIG. 4, this first end of the second part 120 is at the lower end of the second part 120. In FIG. 4, it is shown that this lower end of the second part 120 has entered the hole 131 and, as a result, the movement of the first part 110 is blocked.

For subsequently enhancing further blocking or locking positions of the rocker arm 100 according to the invention, it may be provided that the slotted link 130 is provided with perforated holes, which a user can break out according to requirements.

Figure 5:
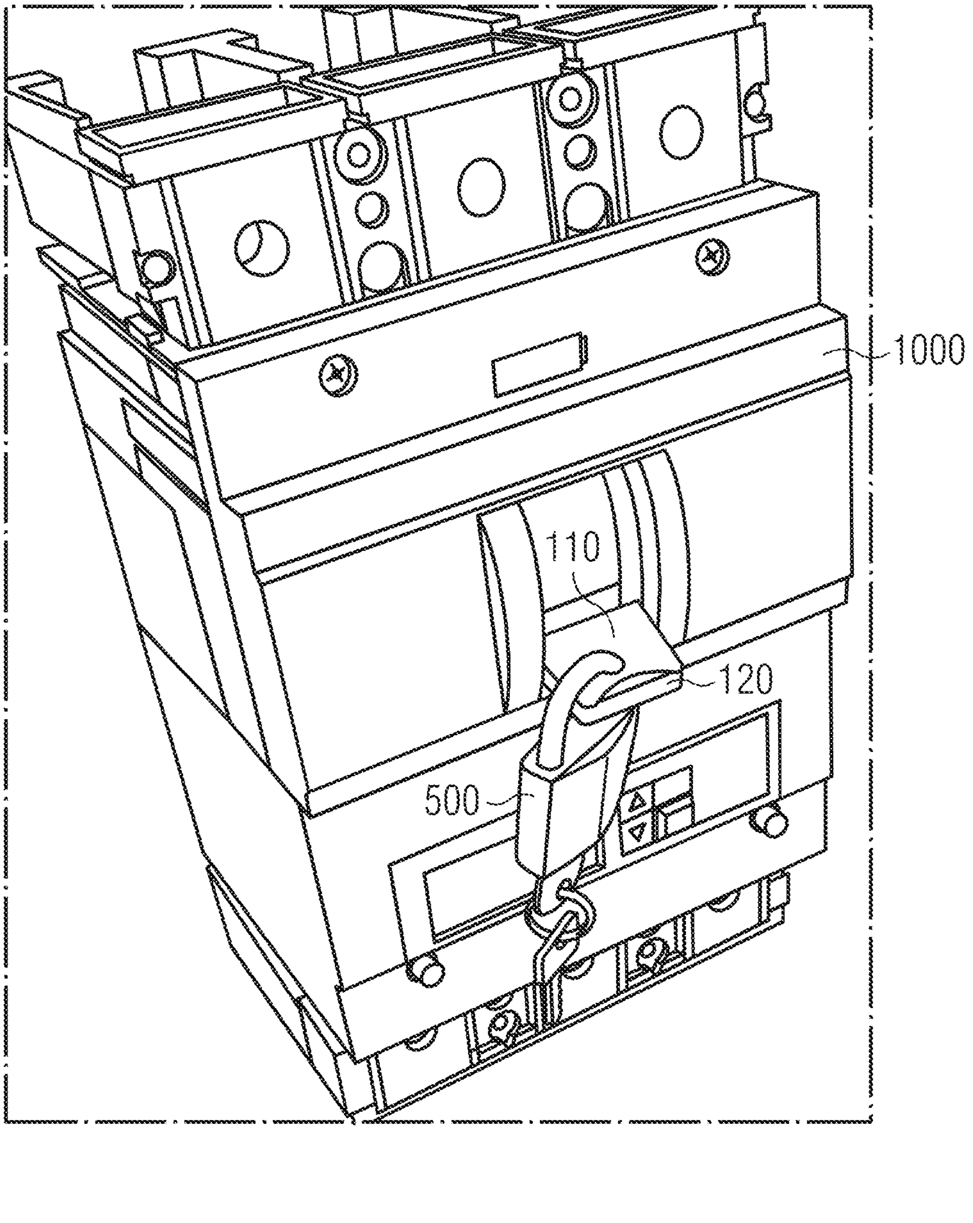
FIG. 5 shows an electric switch with a blocking device according to an embodiment of the invention.

In FIG. 5, the electric switch 1000 with the rocker arm 100 according to the invention is shown. The rocker arm 100 according to an embodiment of the invention, together with the slotted link 130, forms the blocking device 199. Furthermore, a shackle lock 500 may be provided on the blocking device 199, wherein a shackle of the shackle lock 500 is hung on through the in-line bores 111; 121 in the second position of the second part 120 of the rocker arm 100.

In FIG. 5, an electric switch 1000 with a blocking device 199 according to the invention is likewise shown. This blocking device 199 comprises the rocker arm 100 according to the invention, the slotted link 130 and a shackle lock 500.

The rocker arm 100 according to an embodiment of the invention, the blocking device 199 according to an embodiment of the invention and the electric switch 1000 according to an embodiment of the invention create the possibility of locking an electric switch 1000 in the OFF position ("OFF") at its rocker arm 100 with a shackle lock 500.

By making specific changes to the electric switch 1000, for example by breaking out perforated holes at the slotted link 130, it can also be locked in the ON position ("ON").

The second part 120 of the rocker arm 100 according to an embodiment of the invention is pressed by a spring in the direction of the first position. Consequently, the user must press the second part 120 against this spring in order to block the rocker arm 100. The second part 120 is fixed in a hole 131; 132 or clearance when said second part enters the latter. This has the overall effect that the rocker arm 100 according to an embodiment of the invention can no longer be moved. At the same time, the second part 120 on the rocker arm 100 exposes the bores 111; 121, such that, here, a shackle lock 500 can be hung in. The shackle lock prevents the second part 120 from being able to spring back.

While the present invention has been described and illustrated in detail above with reference to the drawings and preferred embodiments, the present invention is not limited to these disclosed embodiments, and more embodiments of the present invention may be obtained by combining the code auditing means in the different embodiments described above, as may be appreciated by those of ordinary skill in the art based on the abovementioned embodiments; these embodiments also fall within the protection scope of the present invention.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A blocking device comprising:

a rocker arm of an electric switch, the electric switch being actuatable by the rocker arm for setting definable positions, the rocker arm including a first part, configured to set the definable positions, and a second part, movable between a first position and a second position, the second position being farther from the first part than the first position; and a slotted link including holes, a first end of the second part of the rocker arm being configured to enter the holes at assigned positions among the definable positions, wherein, in the first position of the second part, the first part is movable into the definable positions, and wherein, in the second position of the second part, movement of the first part is blocked.

2. The blocking device of claim 1, wherein the second part is pressed by a spring in a direction of the first position.

3. The blocking device of claim 1, wherein the second part is configured to extend within the first part.

4. The blocking device of claim 1, wherein the first part includes a first bore and the second part includes a second bore, the first bore and the second bore being configured to align in the second position of the second part.

5. The blocking device of claim 1, wherein the rocker arm is configured to move through part of an arc of a circle with a center point.

6. The blocking device of claim 5, wherein the second part is displaced radially, upon changing between the first position and the second position.

7. The blocking device of claim 1, wherein the definable positions include at least an ON position for closing a circuit and an OFF position for opening the circuit.

8. The blocking device of claim 7, wherein the definable positions further include a tripped position.

9. The blocking device of claim 1, wherein, in the second position of the second part of the rocker arm, the first end of the second part is configured to block the movement of the first part by entering one of the holes.

10. The blocking device of claim 1, wherein the slotted link is provided with perforated holes configured to be broken out by a user.

11. The blocking device of claim 1, further comprising:

a shackle lock, a shackle of the shackle lock configured to hang through in-line bores in the second position of the second part of the rocker arm.

12. An electric switch, comprising:

the blocking device of claim 1.

13. The blocking device of claim 2, wherein the second part is configured to extend within the first part.

14. The blocking device of claim 2, wherein the first part includes a first bore and the second part includes a second bore, the first bore and the second bore being configured to align in the second position of the second part.

15. The blocking device of claim 2, wherein the rocker arm is configured to move through part of an arc of a circle with a center point.

16. The blocking device of claim 2, wherein the definable positions include at least an ON position for closing a circuit and an OFF position for opening the circuit.

17. The blocking device of claim 16, wherein the definable positions further include a tripped position.

* * * * *